Figure 1:
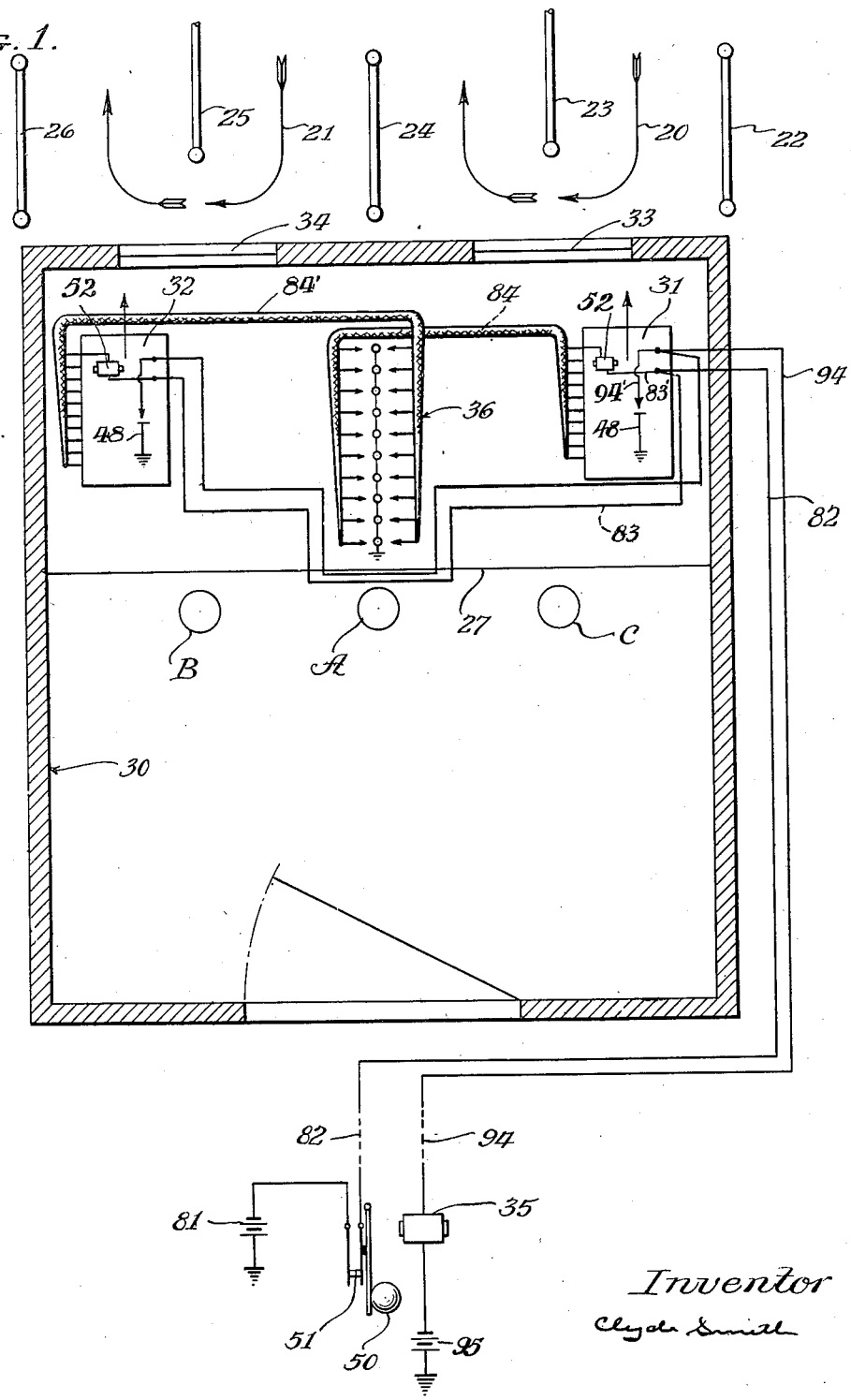

Nov. 27, 1945.   C. SMITH   2,389,823
PARIMUTUEL SYSTEMS
Filed June 6, 1940   4 Sheets-Sheet 2
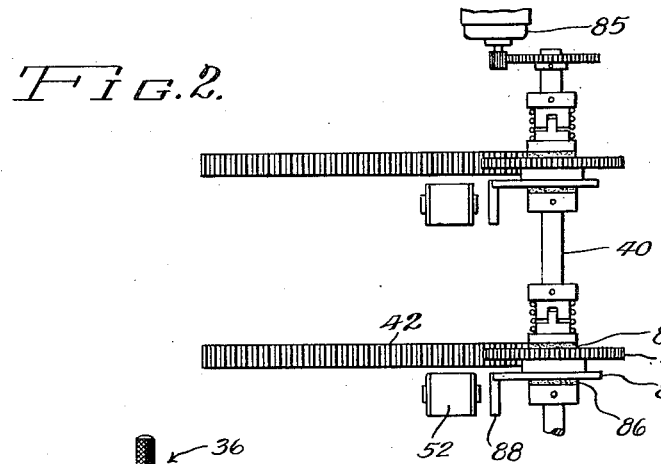
Fig.2.
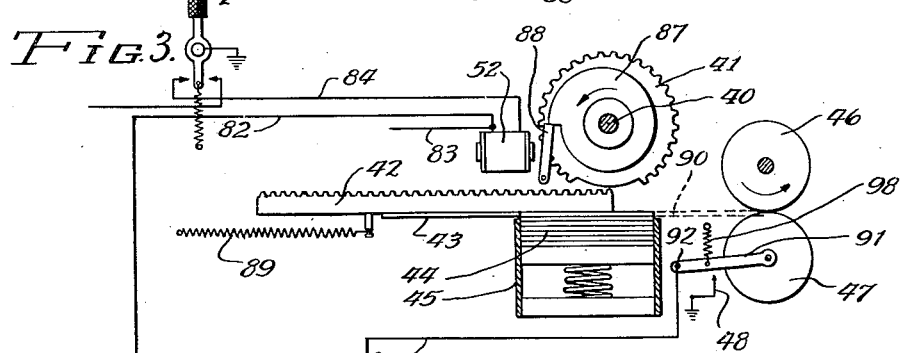
Fig.3.
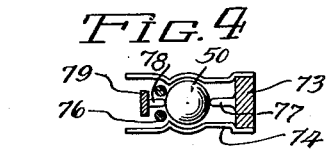
Fig.4.
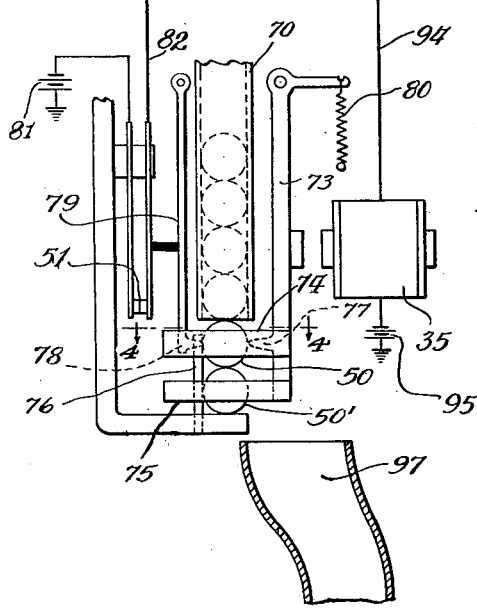
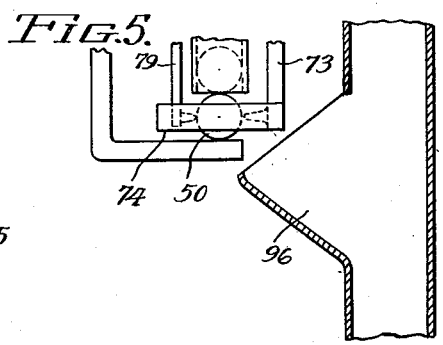
Fig.5.
Inventor
Clyde Smith

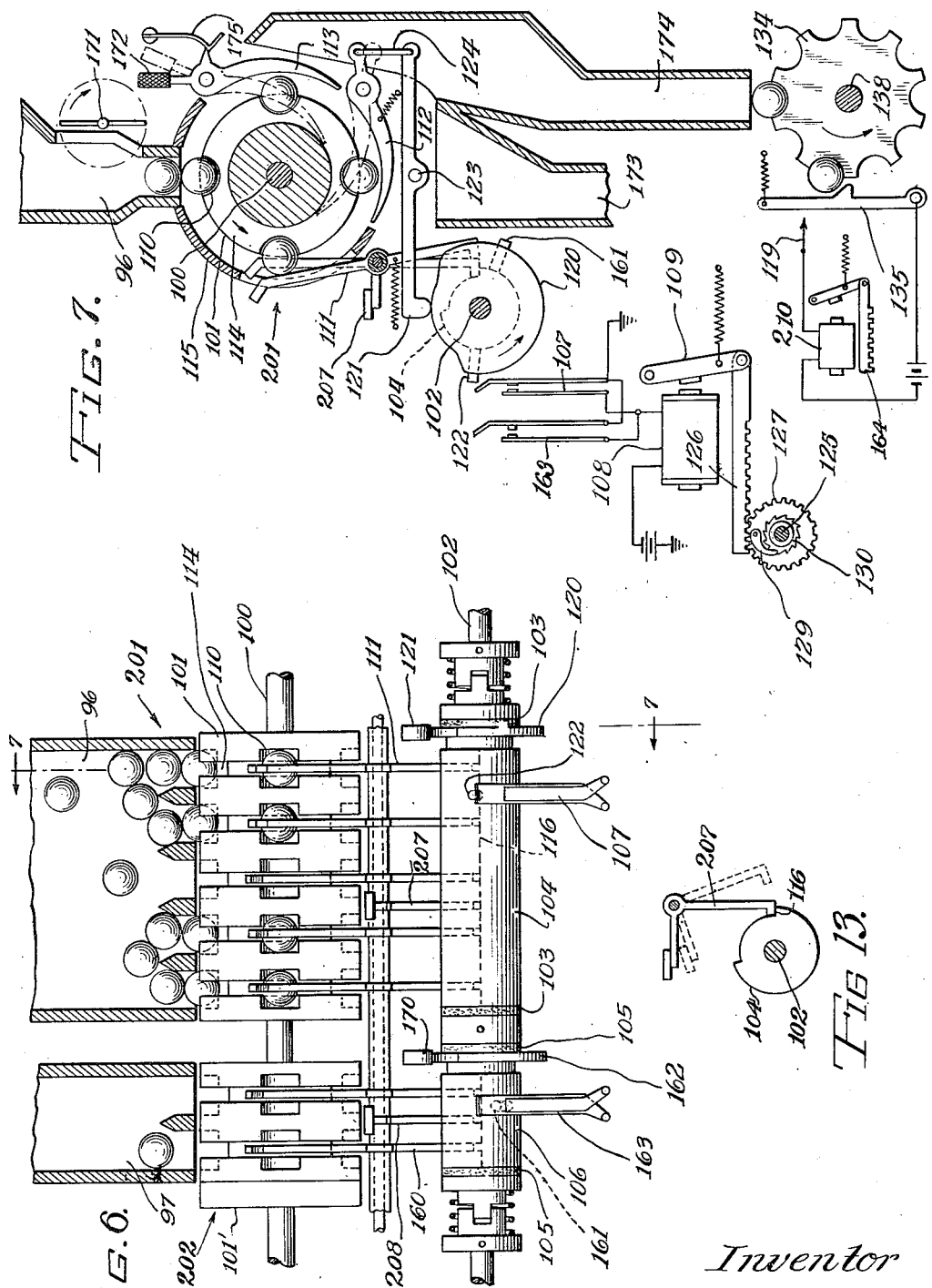

Nov. 27, 1945.  C. SMITH  2,389,823
PARIMUTUEL SYSTEMS
Filed June 6, 1940   4 Sheets-Sheet 4

Inventor
Clyde Smith

Patented Nov. 27, 1945

2,389,823

UNITED STATES PATENT OFFICE 2,389,823

PARIMUTUEL SYSTEM

Clyde Smith, Hopkinsville, Ky.

Application June 6, 1940, Serial No. 339,113

9 Claims. (Cl. 235—92)

My invention relates to indicating systems and more particularly to indicating systems peculiarly adapted for use at public gathering places, public stadia, large department stores and the like, for indicating the total of values corresponding to sale of tickets or commodities, admissions, etc., which have been made at the different selling points.

It frequently occurs, for example, at public gathering places, that tickets, an indication of the total of values of which is desired, are sold during simultaneous periods, with respect to the different features of the exhibition and at a large number of widely distributed points and, further, that these tickets with respect to each feature are sold in a number of different values. Further, the sales are frequently made by means of rapidly operating ticket vending machines at rates determined largely by the capacity of the machine itself.

One of the objects of my invention is to provide an electric system whereby the total value represented by all tickets sold and the total value represented by tickets sold with respect to each of the different features may be continuously indicated during the period in which sales are made. A further purpose of the invention is to provide such a system which is capable of operating with sufficient rapidity to indicate the above mentioned totals substantially simultaneously with the sales, that is, such that the totals which are indicated follow the progress of the sales with substantial accuracy, or with the degree of accuracy that is required, as by rendering the indication in even hundreds or thousands. A further object of my invention is to provide a system capable of accomplishing the above result, notwithstanding the rapid operation of the ticket vending machines.

Another purpose of the invention is to provide means whereby the desired totals may be indicated by any suitable means as by means of dials with cooperating pointers, or by means of a lamp, or by means of groups of lamps which are respectively controlled so that they are lighted so that each group displays a digit of the quantity to be indicated.

In the operation of the system to be described, as briefly stated, an electric impulse is produced in response to each operation of the different ticket vending machines. Each impulse therefore represents a definite value which is to be included in the total. Means are provided whereby all of the impulses from each group of stations which transmit impulses representing equal value are translated into movable tokens which then are collected, without confusion, in a single duct and caused to actuate means included in the totalizing equipment whereby all impulses produced by all of the ticket vending machines are reduced to tokens of equal value. These tokens of equal value are then automatically grouped and added to produce an indication of the desired total in even hundreds, thousands, etc., as is desired, after which ungrouped tokens or remainder tokens are added in value, token by token, to complete the total.

These objects are described in detail herein in a form applicable to mechanism for use in parimutuel systems at race tracks, wherein the described objects and purposes are attained by an integrated system of cooperative apparatus in the operation of which a cashier operates two motor-driven ticket emitters alternatively, electrical impulses representing sales are transmitted from the two ticket emitters over one set of wires, tokens or balls representing sales of the two ticket emitters are released by a single set of ball emitters, emitted balls are assembled into groups representing sales for the horses severally and values of assembled balls are registered first by isonumerical groups and then values of remaining balls are registered one by one and the totalized values for the horses severally are registered on decimal registers having electrical contacts.

A figure display mechanism is provided with electrically illuminated display digits and data is transferred from the totalizer registers to the figure display by means of a system of wiring and a set of keys such in nature that interim transfers of data may be made without stopping the sale of tickets.

It will thus be apparent that, while I particularly mention the use of my invention in connection with the totalizing of the value of tickets sold at public places, exhibitions, theatres and the like, it is by no means limited thereto and may be employed wherever an electric impulse may be produced in response to each unit of value which is to be included in the total to be indicated. For example, my invention has utility in connection with the totalizing of the readings of integrating power meters. Each of the meters, the reading of which is to be included in the total, may be provided with means whereby an impulse is produced in response to each unit of power integrated by the respective meters. The impulse transmitted in response to operation of different meters may represent different units of power as desired and the meters may be variously located. All of these impulses will then be caused to actuate the totalizing equipment to be described whereby the total power integrated by all of the meters may be indicated.

Thus many other applications of my invention will readily suggest themselves to one skilled in the art and all of such applications are contemplated as within the scope of the present invention.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which—

Figure 11:
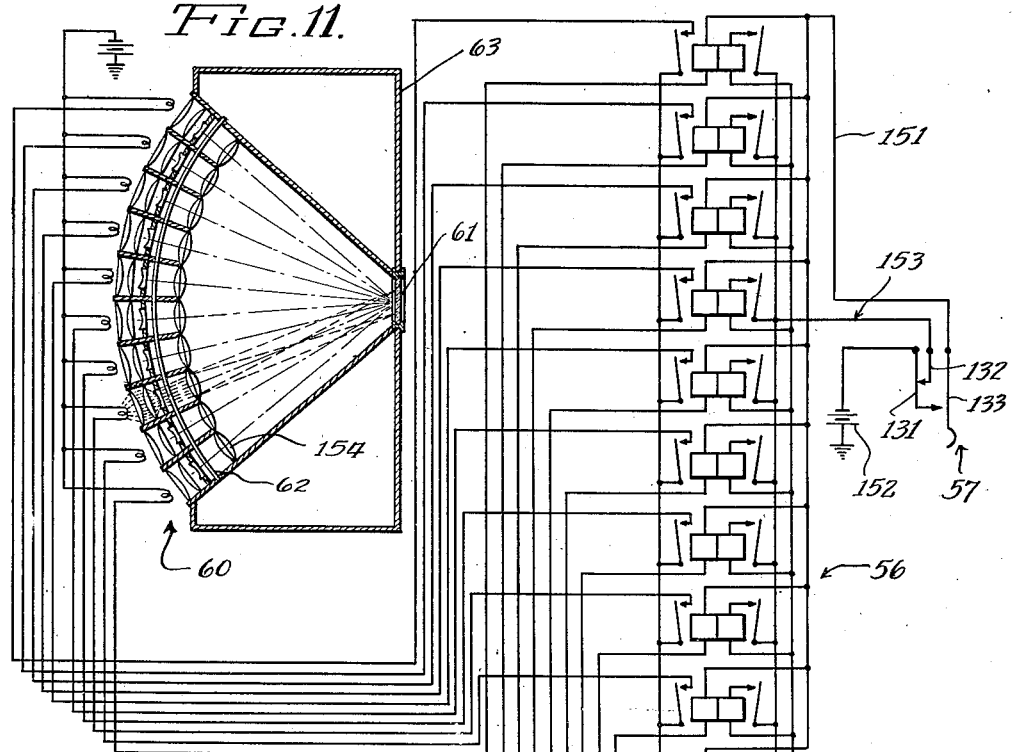
Figures 10, 12:
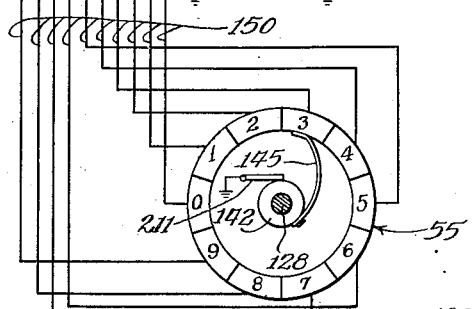
Figures 8, 9:
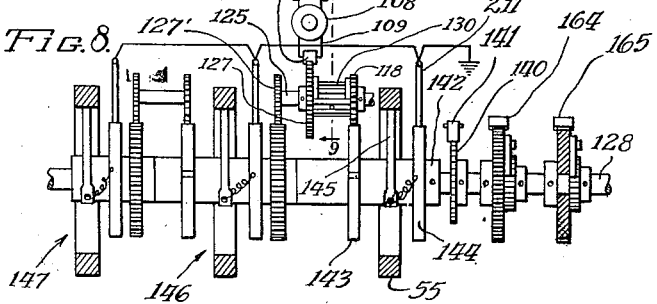

Fig. 1 shows a floor plan and shelf equipment of a ticket-issuing booth, equipped with two ticket emitters which may be operated by one ticket seller, or which may be operated by two ticket sellers concurrently without interference or confusion, Fig. 2 shows a plan of a portion of a ticket emitter, Fig. 3 shows a vertical section of the ticket emitter with one control key having contacts for controlling two ticket emitters alternatively, and in association therewith, shows an elevation of a ball emitter arranged to emit two balls in response to a single electrical impulse representative of sale of one ticket, Fig. 4 shows a horizontal section of the ball emitter of Fig. 3, Fig. 5 shows a modified ball emitter arranged to emit but one ball for each controlling electrical impulse, Fig. 6 shows elevation of a ball machine for balls in groups, Fig. 7 shows a vertical section of the ball machine shown in Fig. 6. with added detail of a further counter for balls singly, Fig. 8 shows the totalizing register of the ball machine, Fig. 9 shows sectional view of a detail of the register shown in Fig. 8, Fig. 10 shows facade of a figure display system, Fig. 11 shows vertical section of one digital unit of the figure display system, with control circuits, Fig. 12 shows a detail of an image strip included in Fig. 11, and Fig. 13 illustrates a manual latch.

In general, a ticket seller in booth 30 sells tickets from ticket emitters 31, 32, through wickets 33, 34 Indication of sales on a single horse from both ticket emitters is made by a single ball emitter which is symbolized by its magnet 35, Fig. 3. Provision of two windows 33, 34, and two ticket emitters 31, 32, associated respectively with the two windows facilitates sale of a greater number of tickets. It is known that usually a purchaser examines his ticket before leaving the window, which delays sale of the next ticket. In the arrangement which I have shown, the patrons approach the windows along the paths indicated by arrows 20, 21, between guide rails 22—23 and 24—25, thereafter departing between guide rails 23—24 and 25—26. During the interval of delay between successive sales at window 33, a ticket seller standing at position A at edge of shelf 27 may sell a ticket to a patron through window 34, and so on alternately, although alternation is not enforced.

In a rush hour, two ticket sellers may stand at positions B and C and may sell independently through the two windows, thus attaining an improved service to the patrons. To assure that the two ticket emitters, when in use by two ticket sellers, will not exercise control at one time over the one ball emitter, a single operating key for each horse is provided in a key set 36. Where horse is mentioned, any contestant is meant, as dog, man, or automobile.

A ticket emitter has a motor-driven shaft 40 with a friction clutch and gear wheel 41 for each horse, each gear wheel having a rack 42 with picker blade 43 for emitting tickets 44 from a magazine 45 into delivery drums 46, 47, one of which closes a contact 48 to energize a ball-emitter magnet 35 which may be arranged to emit one ball or two balls. To sell a ticket, an attendant in booth 30 operates a key to close a contact in key set 36. Incidental to closing the contact of the key, a current flows through grounded battery 81 and ball-controlled contact 51, Figs. 1 and 3, line wire 82, local wire 83, Figs. 1 and 3, clutch magnet 52, Fig. 3, of ticket emitter 31, Fig. 1, local wire 84 and contact of the operated key set 36 to ground. Unless a ball 50 is in position to be emitted, thus holding contacts 51 closed, the clutch magnet 52 will not respond to any key 36, and no ticket will be emitted. Operation of the ticket emitter in response to energization of magnet 52 will cause closure of contact 48, when current for energizing magnet 35 will flow through grounded battery, magnet 35, Figs. 1 and 3, line wire 94, local wire 93, and contact 48 to ground.

Emitted balls pertaining to the horses severally are collected at ball machines, Figs. 6 and 7, of which there are provided one for each horse.

A segmental switch 55 for each order of digits prepares a circuit to a digital relay in relay set 56, which relay corresponds in digital value to the digit instantly indicated by the register, and under control of a manual key 57, a prepared circuit operates a relay in the set 56, which causes a lamp 60, to illuminate a viewing screen 61 through an image of a set 62, thus displaying on the display board 63, the digit indicated by the register member 55.

Balls which have been totalized by all of the horse registers severally pass to a grand totalizer of construction identical with a horse register and having identical display equipment 63.

In detail, the ball emitter, Figs. 3 and 5, comprises a gravity ball magazine 70 which positions two balls 50, 50', to be emitted. An armature 73 has ball-shifting springs 74, 75, which control two balls 50, 50', when operated by magnet 35. Posts 76 assist in positioning the balls. Striker 77 on armature 73, and 78 on operating member 79, caliper the upper ball and transmit energy from armature spring 80 through ball 50 and member 79. to hold closed a contact 51, which prepares a circuit through grounded battery 81, Fig. 1, contact 51, line wire 82, Fig. 1, dividing into two local wires of which wire 83 in Figs. 1 and 3 runs to clutch magnet 52 in ticket emitter 32, while the wire 83' extends to the clutch magnet 52 in the ticket emitter 31. The circuit from the clutch magnet 52 of the ticket emitter 31 is extended through the appropriate one of the wires of a cable 84 to the left hand contact of the appropriate key of set 36 to ground. The circuit is extended from the clutch magnet 52 of the ticket emitter 31 through the associated wire of a cable 84' and thence to the right hand contact of the related key of the key set 36, this key being grounded as indicated in Fig. 1. Operation of the key handle toward ticket emitter 32 will energize a clutch magnet 52 in emitter 32 over local corresponding to wire 83. Motor 85 drives the shaft 40 continuously and by friction disks 86, urges the radial face of stop cam 87 against the armature 88 of magnet 52.

Operation momentarily of a key 36 closes the described circuit and energizes magnet 52, withdrawing armature 88 from the stop cam 87, thus permitting rotation of the stop cam and its attached gear 41. It will be understood, as shown in Fig. 2, that a separate magnet 52 is provided in each emitter 31 and 32 for each horse switch 36, and each magnet 52 has mechanism associated therewith as will now be described for feeding a ticket pertaining to a different horse. For simplicity, but one such magnet 52 has been shown in each emitter 31 and 32. When the blank arc of the gear 41 has passed, the teeth of gear 41 engage rack 42, driving the rack 42 and picker blade 43 to emit a ticket into position between constantly driven drums 46, 47. All teeth of gear 41 having passed the rack 42, and the blank arc again being presented toward the rack, the stop cam 87 engages the armature 88 and a spring 89 returns rack and blade into resting position shown. The emitted ticket 90, propelled now by constantly-driven drum 46, shifts the drum 47 and its arm 91 upon its pivot 92, closing the contact 48, and forming a circuit from ground through contact 48, a wire 94', line wire 94, magnet 35, and grounded battery 95. Armature 73 is operated, balls 50 and 50' are shifted to fall into the duct 97 at the same time that two further balls pass into position adjacent posts 76. Ticket 90 leaves drums 46, 47, permitting spring 98 to open the contact 48, deenergizing magnet 35 and releasing armature 73 which by its return, calipers a newly positioned ball and recloses the contact 51. Operation of the modification illustrated in Fig. 5 is identical except that only one ball is emitted into duct 97.

A ball-storage electrical-contact machine 201 is illustrated in Figs. 6 and 7. A motor (not shown) drives shaft 100 and ball-pocket drums 101, 101' and shaft 102 continuously. Drums 101 and 101' are rigidly attached to the shaft 100. It is apparent that drums 101 and 101' can be made in one piece if desired. Through friction clutch 103, a cam drum 104 is driven when unlatched. Through clutch 105, a similar drum 106 is driven. The drums 104 and 106 may thus be driven independently of each other. Suitable means, described later, are provided to bring about simultaneous operation of drums 104 and 106 under certain conditions. Balls of $5 value are served by duct 97, and ball machine 202 comprising drum 101' and drum 106, while balls of $2 value are served are served by duct 96, and ball machine 201 comprising drum 101 and drum 104.

Drum 101 has ball pockets 110 in annular and in axial alignment. Each set of ball pockets in annular alignment has a latch 111 operated by a ball in a pocket and has two ball-ejector tines 112, 113, which may be operated into an annular groove 114. A housing 115 supplemented by tines 112, 113, holds all balls in the pockets until a set of tines is operated to eject a set of balls. Cam drum 104 is shown with a cam edge 116, engaging manual latch 207, and five ball-controlled latches 111 which serve five balls in five pockets 110, in any axial row. An end cam 120 on drum 104, has a follower 121, the follower 121 being pivoted at 123 and being connected by a link 124 to a comb of five tines 112. A striker 122 on drum 104 operates contacts 107 to close an obvious circuit for energizing a register magnet 108, thus operating armature 109 and rack 126, which operates a gear 127, rotatable loosely on register shaft 128. By pawl 129 the loose gear 127 operates ratchet 130 fixed on shaft 128. Five tines 113 are united in a comb operable by handle 172. A further ball-pocket wheel 134, on a power-driven shaft 138, having but one annular row of ball pockets, shifts $2 balls past a ball follower 135, which in response to each ball closes follower 135 to contact 119 which, by an apparatus like that shown in Fig. 9, shifts rack 164 to rotate the shaft 128 two-tenths of a revolution to register $2. Shafts 100 and 138 may turn at any desired speed. Shaft 102 turns at four times the speed of shaft 100. Register shaft 128, Fig. 8, has holding ratchet 140 and detent pawl 141. Hub 142, fixed on shaft 128, carries single-tooth carry gear 143, and also carries in electrical continuity a feed ring 144 and brush 145 of units segmental switch 55. Similar equipments for tens and hundreds orders but sleeved on shaft 128 are illustrated at 146 and 147.

Shaft 125 has fixed ratchet 130, fixed carry gear 127, loose carry gear 118, and loose input gear 127, the loose gears 127 and 118 being held in position by set collars. Pawl 129 on wheel 127 drives the ratchet 130, and a similar pawl on gear 118 also drives ratchet 130. Operation of wheel 127 thus results in registering values directly upon the tens dial or upon any desired mean dial of the register of Fig. 8.

Each segment of each segmental switch is connected by a wire 150 to an operating winding of a relay of a set 56, the units segmental switch and the units relays being illustrated. The operating circuit may be traced from ground, Fig. 8, through ring 144, brush 145, a segment of switch 55, Fig. 11, wire 150, left-hand winding of a relay of set 56, and wire 151 to contact 133 of manual switch 57. When switch 57 is operated, the operating circuit is completed through contact 131 and grounded battery 152. Before the described operating circuit is opened, a locking circuit is formed through grounded battery 152, contacts 131, 132, wire 153, and contact and right-hand winding of an operated relay to ground. The operated relay energizes a lamp 60 over an obvious circuit. The energized lamp illuminates an image of the strip 62 which illuminated image is projected by a lens 154 upon screen 61 for viewing. Arrangement of lamps, image strip, lenses and viewing screen in a light-tight display unit 63 is clear from Fig. 11, and an arrangement of such units 63 is illustrated in Fig. 10 to form a display system.

Description above has been applied to $2 balls emitted by an emitter according to Fig. 5 into duct 96 and totalized through pocket drum 101. Substantially duplicate equipment is provided for sales of $5 and $10 tickets. Sale of a $5 ticket operates an emitter identical with Fig. 5, but positioned to emit a ball into a duct 97, while sale of a $10 ticket operates an emitter as illustrated in Fig. 3, emitting two balls into duct 97. Balls in duct 97 thus have a value of $5 each. Five $2 balls in an axial line in the right-hand portion of drum 101 have a value of $10 and that value is registered by means of latches 111, cam drum 104, cam 120, striker 122, rack 126, gear 127 and ratchet 130. Two $5 balls in an axial line in the left-hand portion of drum 101 have a value of $10 and that value is registered by duplicated means, namely, latches 160, cam drum 106, striker 161, contacts 163, and circuit including magnet 108, Fig. 8. Remainder balls of $5 value are served by a duplication of drum 134, follower 135, and contact 119, which for $5 balls operates another duplicate of the apparatus of Fig. 7, including rack 165, to turn shaft 128 through five-tenths of a revolution, thereby to register $5 on the register of Fig. 8. The ball pockets in drum 101' are axially aligned with the ball pockets in drum 101 as shown in Fig. 6, the arrangement being such in the present embodiment that the ball pockets in the two drums are axially aligned in sets of seven each, four such sets being equally spaced around the periphery of the drums. In the event that a set of seven axially aligned ball pockets is completely filled, all the latches 111 and 160 are tripped simultaneously, causing the cam drums 104 and 106 to take motion simultaneously. Strikers 122 and 161 are positioned approximately one-half revolution apart. Thus when drums 104 and 106 are released simultaneously by ball control, the two impulses in magnet 108 will be spaced apart, causing the magnet to operate independently in response to the spaced impulses.

It has been mentioned above that shaft 102 is driven at four times the speed of shaft 100. Thus, whenever a cam drum 104 or 106 is released by a line of balls in drum 101 or 101' coming into contact with the latches 111 or 160, the corresponding cam drum will make a complete revolution before the next succeeding line of balls strikes the latches. If only one of the cam drums is released, the other cam drum remains stationary during the entire cycle of the first cam drum, inasmuch as the illustrated arrangement does not enable both cam drums to be in motion except when both have been simultaneously released as just described.

Latches 207 and 208 may be operated manually to lock or to unlock either or both of their respective drums 104 and 106. Fig. 13 shows manual latch 207 in solid line in locking position and in dotted line in unlocking position. A ball-agitator shaft 171 is motor-driven and causes its arms to enter the ducts 96 and 97 to disturb any locking formation of balls which might block the exits of the ducts.

Operation of the complete system is as follows: On days of normal or desultory traffic, each ticket booth 30 may be operated by one man, indicated at A, and on days of high traffic, each such booth may be operated by two men, as indicated at B and C, thus increasing the sales facilities without increasing the counting equipment at the central office.

An attendant watching the totalizers will operate keys 207, 208 for all the horses, to release cam drums 104, 106 when the groups of pockets of these drums are filled, thus totalizing continuously all $2 and $5 balls, and after such totalization of the several horses, the balls from the several individual horse totalizers will pass through ducts as 173 to a grand totalizer (not shown). As each full row of balls releases the drum 104 or 106 or both, the striker 122 operates contact 107 to register the value of the row of balls and operates follower 121 to dump the balls, the follower 121 operating the link 124 to swing all tines 112 from solid-line position to dotted-line position, thus combing the balls out of the pockets and not relying on gravity.

Periodically, say once each minute, the attendant operates the key 57 momentarily to transfer to the display board the instant total shown on register of Fig. 8 for each horse and for the grand total. Such registrations will be approximations, since ticket sales are continuous and some balls always are in process. To avoid possible undesirable movement of segmental brushes 145 while keys 57 are being operated, latches 207 and 208 may be moved to hold their cam drums 104 and 106 during the moment of transfer of lamp control to the figure display mechanism. This is effected by lifting the finger plate of the latch 207 to rotate the downward tail of the latch 207, Fig. 6, into the path of a radial face of a cam on cam drum 104, Fig. 7, so that cam drums 104 and 106 are held against rotation even though a full quota of balls may lift all latches 111 and 160.

When ticket selling ceases and balls no longer are available to trip the cams 104 and 106 by full axial rows of balls, the attendant by handle 172 operates tines 113 into dotted-line position, where they are held by a jockey 175, combing all remainder $2 balls into duct 174 which delivers them to wheel 134 to operate the follower 135 for totalization on shaft 128 and register 147. Thereafter, the remainder $5 balls are similarly totalized. The totalized remainder balls then are delivered by wheel 134 into duct 173 for the grand totalizer. Duct 173 leads from the horse register of Fig. 7 to the grand totalizer, not shown, where it becomes a storage hopper for $2 balls in the same manner that duct 96 leads from the ball emitters of Fig. 5 to the horse register of Fig. 7 to become the storage hopper for $2 balls in the horse register.

When all balls, including all remainder balls, have been totalized on horse registers and on the grand total register, all keys 57 may be operated momentarily to transfer the final totals to the display mechanism, and all registers, Fig. 9, immediately may be reset to zero position in readiness for a subsequent event, in any desired manner, as by turning the segmental switches and brushes forward to zero manually, or by electrical impulses through the various magnets shown and described, or by any known means for resetting registers which is a well known art.

The invention has been described by an illustration involving limitations of a specific machine. In the appended claims, the invention will be described more broadly to disclose its full scope and intention.

What is claimed is:

1. In a totalizer for tokens, a register, first means to group said tokens into groups having uniform value, second means to enter said group values into said register group by group, third means to enter values of others of said tokens into said register token by token, and further means for rendering said entering means operative alternatively.

2. In a totalizer for tokens, a register having wheels of successive digital orders, first means to group said tokens into groups having uniform value equal to a step of a median one of said wheels, second means to enter said group values into said register upon said median wheel group by group, third means to enter values of others of said tokens into said register upon the lowest digital order of said wheels token by token, and further means for rendering said entering means operative alternatively.

3. In a totalizer for tokens of variant values, a register, a magnet, means responsive to operation of said magnet for entering a predetermined value into said register, first grouping means for forming a group of tokens of a first value per token totaling said predetermined value, a first contact responsive to such a formed group of first value tokens, means responsive to said first contact to energize said magnet, further grouping means for forming a group of tokens of a different value per token totaling said predetermined value, a further contact responsive to such a group of different value tokens, and means responsive to said further contact to energize said magnet.

4. In a ball-controlled totalizing machine, a ball-carrying drum, ball pockets in groups in said drum, ball-controlled register-controlling means, a register, means responsive to a full complement of balls in a group of pockets for releasing said register-controlling means to control said register, and means responsive with said register-controlling means for removing used balls from said drum.

5. In a ball-controlled totalizing machine, a ball-carrying drum, ball pockets in groups in said drum, ball-controlled register-controlling means, a register, means responsive to a full complement of balls in a group of pockets for releasing said register-controlling means to control said register, and manually controlled means for removing from said pockets all remainder balls not utilized in said groups.

6. In a ball-controlled totalizing machine, a register, registering means responsive to balls of one value for registering the values of said balls on said register, further registering means responsive to further balls of another value for registering the values of said further balls on said register, means operable to condition said registering means and said further registering means for operation, and means operable upon said registering means and said further registering means when simultaneously conditioned to enforce alternate operation of said registering means and said further registering means.

7. In a ball-controlled totalizing machine, a register, register-control means, driving means for said register-control means, and a plurality of ball-controlled latches each restraining said register-control means, said register-control means being restrained until all of said latches are controlled concurrently by balls.

8. In a ball-controlled totalizing machine, a register, first means for operating said register by control of balls mechanically arranged in isonumerical groups of balls, second means for operating said register by control of balls singly, and manually operable mechanical means for transferring from said first means to said second means all balls not utilized in formation of groups in said first means.

9. In a ball-controlled totalizing machine, a plurality of ball-carrying drums provided with ball pockets arranged in groups in said drums, a register, register operating means, a plurality of controlling devices for said operating means one for each of said drums, means responsive to a full complement of balls in a group of pockets in any of said drums for operating the corresponding one of said devices, and means for selectively disabling any of said controlling devices.

CLYDE SMITH.